United States Patent [19]

Dorsch et al.

[11] Patent Number: 4,822,682

[45] Date of Patent: Apr. 18, 1989

[54] ORIENTED POLYMER MATERIALS

[75] Inventors: Dieter Dorsch, Darmstadt; Rudolf Eidenschink, Mühltal; Claus P. Herz, Heidelberg, all of Fed. Rep. of Germany

[73] Assignee: Merck Patent Gesellschaft mit Beschränkter Haftung, Darmstadt, Fed. Rep. of Germany

[21] Appl. No.: 76,818

[22] Filed: Jul. 23, 1987

[30] Foreign Application Priority Data

Jul. 23, 1986 [DE] Fed. Rep. of Germany ....... 3624898

[51] Int. Cl.$^4$ ............................ B32B 9/04; B05D 3/06
[52] U.S. Cl. ................................. 428/411.1; 427/35; 427/53.1; 427/54.1; 427/162
[58] Field of Search ............................ 428/215, 411.1; 430/270; 427/53.1, 162, 35, 54.1

[56] References Cited

U.S. PATENT DOCUMENTS 4,412,059 10/1983 Krigbaum et al. ............. 428/215 X
4,536,450 8/1985 Garito ............................. 428/411.1

FOREIGN PATENT DOCUMENTS 0021695 1/1981 European Pat. Off. ......... 428/411.1

Primary Examiner—Thomas J. Herbert
Attorney, Agent, or Firm—Millen & White

[57] ABSTRACT

Articles having a substrate coated with a oriented polymer having polar monomer units wherein the monomer units and main polymer chains originate from cyclic monomers polymerized by ring opening polymerization through impinging light on the coated surface.

5 Claims, No Drawings

ORIENTED POLYMER MATERIALS

BACKGROUND OF THE INVENTION

The invention relates to new polymer materials with non-linear optical properties and processes for their preparation.

Non-linear optics are concerned with the interaction of electromagnetic fields in various media and the associated formation of new fields with changed properties. Materials with non-linear optical properties have a dielectric susceptibility which depends on the field strength and results in a number of dispersive processes: frequency doubling (second harmonic generation=SHG) allows generation of light of half the wavelength compared with the incident light; the electrooptical effect (Pockels effect) allows a change in the refractive index when a direct current electrical field is applied; methods of sum and difference frequency mixing and frequency distribution permit continuous adjustment of laser light.

The abovementioned effects result in a large number of technical applications. Optical switches and waveguides for construction of purely optical computers, frequency and intensity control in laser technology, holography and the sectors of information processing and integrated optics are exemplary fields of use for materials with non-linear optical properties.

In order to be suitable for use in the field of non-linear optics, such materials must fulfill a number of requirements. One such requirement is that arrangement of the molecules in crystalline form should be non-centrosymmetric. In addition, technical usefulness requires that the materials have the maximum possible values for dielectric susceptibility, X. (Y. R. Shen, The Principles of Nonlinear Optics, Chapter VI, John Wiley, New York, 1985).

A number of inorganic substances, such as, for example, potassium dihydrogen phosphate or lithium niobate, exhibit non-linear optical properties. However, all these compounds have diverse disadvantages. As well as inadequate values of the second order dielectric susceptibility, inorganic compounds frequently have the deficiency of inadequate photostability during treatment with high light intensities or, as a result of being highly colored, inadequate transparency.

Organic compounds of the nitroaniline type are known from Garito et al., Laser Focus 18 (1982) and European Pat. No. 0,091,838. Their relatively good values for photochemical stability and second order dielectric susceptibility are accompanied, however, by a poor crystallizability and a lack of mechanical stability. In particular, it is not possible to prepare thin layers, as required by integrated optics, with these materials.

Polymers are distinguished by a high mechanical resistance and good chemical stability. Molecules with non-linear optical properties attached to the polymer skeleton or dissolved in the polymer should therefore have high mechanical resistance and good chemical stability combined with advantageous values of dielectric susceptibility in the non-centrosymmetric environment.

Polymers with second ordeer non-linearities can be prepared by applying an external field to polymer films heated above the glass transition temperature and doped with randomly oriented molecules. This leads to poling of the embedded molecules which imparts antisotropy to the polymer medium after the medium was solidified. Polymers which are prepared in this manner, have non-linear optical properties. Such doped polymer systems wherein p,p'-dimethylaminonitrostilbene is used as the host molecule have been described by Meredith et al., Macromolecules 15 (1982) 1385.

Shibaev et al., Polymer Communications 24 (1983) 364 report field-induced alignment of liquid crystal polymers with mesogenic side groups.

U.S. Pat. No. 4,412,059 discloses a polymer material with cholesteric mesophases which are accessible by means of electric or magnetic fields with a controlled alignment. In addition, fully aromatic, thermotropic, liquid crystal polymers in which the non-linear optical properties can likewise be caused by external fields are known from European Pat. No. 0,172,012.

Another method for producing polymer materials with non-linear optical properties comprises polymerization of monomers already ordered with a non-centrosymmetric orientation, the order of this system largely being retained during the polymerization. Monomers which are suitable for this technique are to be found, for example, in European Pat. No. 0,021,695.

The materials obtained by the processes described above still have unsatisfactory non-linear optical properties. Only incomplete alignment of the composite polymer is obtained by the action of an external field, which is an additional process step. In the pre-ordered monomers incomplete alignment results from orientation losses occurring during polymerization.

SUMMARY OF THE INVENTION

It is an object of the invention to provide oriented polymer materials applied to a surface, and for a process for their preparation wherein the polymer materials do not possess the disadvantages described, or display them to only a slight degree.

It is a further object of the invention to provide a process for preparation of oriented polymer materials which in particular allows the polymer structure already to be oriented during the polymerization operation without the need for additional process steps.

Upon further study of the specification and appended claims, further objects and advantages of this invention will become apparent to those skilled in the art.

These objects are achieved by a process according to the invention wherein cyclic monomer units with polar groups are polymerized by subjecting the cyclic monomers to ring-opening polymerization by zonal irradiation to form the resultant polymer materials.

The invention therefore relates to polymer materials comprising polar monomer units applied to a surface characterized in that the monomer units and the main polymer chains have an orientation which is preferably substantially parallel to the substrate surface. In a particularly preferred group of polymer materials according to the invention, the monomer units are preferably aligned in dipolar arrangement. The degree of parallel orientation is preferably at least about 60%, for both monomers and polymer chains with an angular deviation from the horizontal of not more than about 10°, especially at least about 80% with an angular deviation of not more than about 5°.

The invention furthermore relates to a process for the preparation of such polymer materials by exposing cyclic monomers which are capable of ring-opening polymerization and contain polar groups to zonal irradiation following the preferential direction of polymer growth, along the axis to which the chains are essentially parallel.

Polymer materials obtained by this process are suitable as optically non-linear media.

Ring-opening polymerization of cyclic monomers is known. Thus, processes for ionic ring-opening and subsequent polymerization of, for example, ethylene oxide, tetrahydrofuran, caprolactone and caprolactam are described in Frisch, Reegen (editors), Ring-opening Polymerization, Marcel Dekker, New York, 1969, Saegusa, Goethals (editors), Radical Polymerization American Chemical Society, Washington, 1977 and Yvin, Saegusa (editors), Ring-Opening Polymerization, Elsevier, London, 1984.

Monomers which are accessible to free radical ring-opening and polymerization are, for example, bicyclobutanes (Hall, Ykman, J. Macromol. Sci, Rev. Macromol. Chem. 11 (1976)), Olefins (Errede, J. Polym. Sci., 49 (1961) 253), spirorthocarbonates (Endo, Bailey, J. Polym. Sci., Polym. Lett. Ed. 18 (1980) 25) or cyclic ketene acetals (Endo et al., Makromol. Chem. 186 (1985) 1543); the free radicals can be formed by heat or photochemically.

It has now been found, surprisingly, that ring-opening polymerization, initiated by zonal irradiation following the preferential direction of polymer growth, of cyclic monomers containing polar groups, of the general formula I

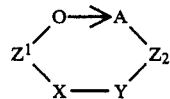

wherein
D→A is a molecular fragment comprising an organic skeleton containing polar groups D and A,
$Z^1$ and $Z^2$ are unsubstituted or substituted carbon chains, in which one or more C atoms are optionally replaced by hetero atoms, and
X—Y is a group which can be split to form a monomer fragment capable of polymerization,
gives novel polymer materials, the monomer units and main polymer chains of which preferably have a parallel orientation towards the substrate surface. Such polymer materials are outstandingly suitable as non-linear optical media.

In the cyclic monomers of the formula I to be polymerized, the polar group D in the molecular fragment D→A has the properties of an electron donor group, such as, for example, an amino, ether, phosphine or alcohol group, while polar group A has the properties of an electron acceptor group, such as, for example, a nitro, cyano, ester or anhydride group, or a quinone or halogen. Preferably, D denotes an amino or alcohol group and A denotes a nitro or ester group. (D. J. Williams, Angew. Chem., Int. Ed. Engl. 23, 690 (1984).

The abovementioned group are located on an organic skeleton, preferably an aromatic system. Systems which are suitable here are, for example, benzene which is substituted by the groups D and A in the 1,2- or 1,4-position, biphenyl or stilbene which is substituted by groups D and A in the 4,4'-position or naphthalene which is substituted by groups D and A in the 2,6-position.

$Z^1$ and $Z^2$ each independently represent an alkyl chain having 1 to 18 C atoms, in which one or more $CH_2$ groups can also be replaced by —O—, —CO—, —CO—O—, —NH—, —N(alkyl)— or —CH=CH—. Preferred replacing groups are —O—, —CO—O— and —NH—.

The group X—Y which can be split to produce fragments capable of polymerization is a structural element which can be split by free radicals, ionically or by heat, such as, for example, peroxides (X—Y=O—O), cyclic orthoesters (O—CHR—O; R=organic radical), cyclic orthocarbonates (O—C(OR)$_2$—O) or ketone acetals (O—C(=CR$_2$)—O), the latter being a preferred group X—Y.

Cyclic monomers with these reactive groups are obtainable in accordance with instructions which can be found in the abovementioned publications or by methods which are known per se, such as are described in the literature (for example in the standard works, such as Houben-Weyl, Methoden der Organischen Chemie (Methods of Organic Chemistry), Georg-Thieme-Verlag, Stuttgart), and in particular under reaction conditions which are known and suitable for the reactions mentioned. Variants which are thereby be used.

Thus, for example, the particularly preferred monomers of the formula I in which X—Y denotes a ketene acetal function are obtainable from 2-halogenomethyl-1,3-dioxacyclo compounds by the action of a strong base, such as, for example, sodium amide or potassium tert.-butanolate, in an inert solvent.

The precise structure of the monomer is uncritical as long as the molecular structure provides a substrate for the two polar groups D and A and a means for polymerizing the substrate such that the necessary recurring structure described herein is achieved, preferably via the X—Y moiety. In essence, any polymer will be appropriate for use in accordance with this invention as long as its recurring unit has the dipolar moiety D→A.

The specific nature of the groups to which D and A are attached is non-critical as are the details of the Z chains and the identity of the R groups which may also include H.

The photoinitiators required to start the polymerization are added to the monomers simply by dissolving or stirring in.

A large number of known initiators, such as are described for example, in Pappas (editor), UV Curing: Science and Technology, Technology Marketing Corp., Stamford, CT, 1978, or in Ocian, Principles of Polymerization, McGraw-Hill, New York, are suitable for starting the polymerization. Examples of free radical initiators which dissociate under the influence of heat are percompounds, such as potassium persulfate, dibenzoyl peroxide and cyclohexanone peroxide, and examples of initiators which dissociate by the action of radiation are benzophenones, such as, for example, Michler's ketone [4,4'-bis(dimethylamino)benzophenone], 4,4'-bis(diethylamino)benzophenone, p-dimethylaminobenzophenone, p-chlorobenzophenone and benzophenone; anthraquinones, such as, for example, anthraquinone, 2-chloroanthraquinone and 2-alkylanthraquinones; xanthones, such as, for example, 2-halogenoxanthones or 2-alkylxanthones; thioxanthones, such as 2-chlorothioxanthone and 2-alkylthioxanthones; acridanones, such as, for example, 2-alkylacridanones or N-substituted acridanones; benzoins, such as, for example, p-dimethylaminobenzoin and alkyl ethers of benzoin; benzil ketals, α-halogenoketones, dialkoxyacetophenones, α-hydroxyalkylphenones and α-aminoalkylphenones, such as are described, for example, in German Offenlegungsschrift No. 2,722,264 and in European Published Application No. 3,003, and furthermore, for example, fluorenones, dibenzosuberones, phenanthrenequinones, benzoic acid esters, such as, for example, hydroxypropyl benzoate and benzoylbenzoate acrylate, as well as onium salts, such as, for example, diaryliodonium or triarylsulfonium salts.

Examples of ionic catalysts useful for free radical polymerization are hydroxides, such as potassium hydroxide, alkali metal-organic compounds, such as phenyllithium and naphthalenesodium, Lewis acids, such as $BF_3$, $AlCl_3$, $SnCl_4$ and $TiCl_4$, metal complexes in the form of aluminium or titanium compounds and strong acids, such as fluorosulfonic acid.

The photoinitiators are as a rule added to the monomers in amounts of about 0.1 to 20% by weight, preferably about 0.5 to 12% by weight.

If necessary, a number of additives can be used with the photopolymerizable cyclic monomers. These additives include reaction accelerators and light stabilizers.

Examples of reaction accelerators which can be added are organic amines, phosphines, alcohols and/or thiols, all of which contain at least one CH group in the α-position relative to the hetero atom. Suitable accelerators are, for example, primary, secondary and tertiary aliphatic, aromatic, araliphatic or heterocyclic amines, such as are described, for example, in U.S. Pat. No. 3,759,807. Examples of such amines are butylamine, dibutylamine, tributylamine, cyclohexylamine, benzyldimethylamine, dicyclohexylamine, triethanolamine, N-methyldiethanolamine, phenyl-diethanolamine, piperidine, piperazine, morpholine, pyridine, quinoline, ethyl p-dimethylaminobenzoate, butyl p-dimethylaminobenzoate, 4,4'-bis-dimethylamino-benzophenone (Michler's ketone) or 4,4'-bis-diethylamino-benzophenone. Tertiary amines, such as, for example, trimethylamine, tri-isopropylamine, tributylamine, octyldimethylamine, dodecyl-dimethylamine, triethanolamine, N-methyl-diethanolamine, N-butyl-diethanolamine, tris-(hydroxypropyl)amine and alkyl dimethylaminobenzoate, are particularly preferred.

Other possible reaction accelerators are, for example, trialkylphosphines, secondary alcohols and thiols.

Small amounts of light stabilizers, such as, for example, benzophenone derivatives, benzotriazole derivatives, tetraalkylpiperidines or phenylsalicylates, can also be added.

Organic additives, such as thixotropic agents, flow control agents, binders, lubricants, matting agents, plasticizers, wetting agents, silicones for improving the nature of the surface, anti-flooding agents or small amounts of solvents, are also suitable as additives to the cyclic monomers to be polymerized, depending on the intended use.

Photopolymerization is carried out by methods which are known per se by irradiation with light or UV radiation of the wavelength range from 250 to 500 nm, preferably 300 to 400 nm. Sunlight or artificial lamps can be used as radiation sources. Examples of advantageous lamps are high pressure, medium pressure or low pressure mercury lamps, xenon lamps and tungsten lamps; laser light sources can also be used.

High-energy radiation, such as, for example, X-rays and electron, neutron and other nuclear radiation, is furthermore suitable for starting the polymerization, in which case the amount of photoinitiator added can usually be reduced or dispensed with entirely.

Thermal polymerization is carried out, for example, by simple heating, by treatment through the means of ultrasound or microwaves or by the action of IR radiation.

In the process according to the invention for ring-opening polymerization of cyclic monomers, these are applied in the desired layer thickness to a substrate, if appropriate after addition of one or more of the abovementioned additives, by, for example, coating, printing or immersion, if necessary after prior solution in a suitable solvent, and exposed to zonal radiation, for example with one of the abovementioned radiation sources, which follows the preferential direction of polymer growth.

The irradiated monomer surface is thereby limited in the form of zones, advantageously by a correspondingly designed mask or screen or, in particular, a slit-shaped opening placed between the radiation source and monomer layer or by an optical arrangement in the ray path. The irradiated zone follows the polymerization direction at a speed comparable to the progress of the polymerization, and the necessary relative speed of the irradiation zone with respect to the monomer layer is effected either by moving the opening transparent to radiation over the monomer layer or by transporting the substrate, for example on a conveyor belt, under the radiation source. In any case, the polymerization preferably takes place in the direction of the relatively progressing radiation, whereupon the main polymer chains and monomer units have a preferably parallel orientation to the substrate surface. Polymer materials thus prepared have advantageous values of the second order dielectric susceptibility; they exhibit a favorable transparency and have high stabilities towards mechanical, chemical and actinic influences.

Because of their advantageous non-linear optical properties, the polymer materials according to the invention open up a wide field of use. In particular, they are suitable for frequency doubling of laser light and for the production of switching elements, waveguides and phase modulators in the field of integrated optics.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLE 1

Preparation of the starting materials (a) A solution of 26.6 g of 4'-(6-hydroxyhexyloxy)(1,1')-biphenyl-4-carboxylic acid, 16 g of epoxystyrene and 16 g of triethylamine in 300 ml of tetrahydrofuran is heated at the boiling point for 140 hours. It is diluted with 1000 ml of methylene chloride, washed twice with 2N hydrochloric acid and dried over sodium sulfate. After concentration under reduced pressure, the residue is crystallized from ethanol. 2-Hydroxy-2-phenylethyl 4'-(6-hydroxyhexyloxy)-(1,1')-biphenyl-4-carboxylate is obtained; melting point: 148°–150°.

(b) A mixture of 6.1 g of 2-hydroxy-2-phenylethyl 4'-(6-hydroxyhexyloxy)-(1,1')-biphenyl-carboxylate, 4.4 g of chloroacetaldehyde dimethylacetal and 3 mg of p-toluenesulfonic acid is kept at a temperature of 140° for 2 days. Methanol formed during the reaction is thereby distilled off continuously. After drying under reduced pressure, the cyclic acetal 9-chloromethyl-14-oxo-11-phenyl-1,8,10,13-tetraoxa[14](4,4')biphenylophane is obtained as a viscous oil.

(c) A solution of 1.98 g of 9-chloromethyl-14-oxo-11-phenyl-1,8,10,13-tetraoxa[14](4,4')-biphenylophane, 532 mg of potassium tert.-butanolate and 8 ml of tert.-butanol is heated at 80° C. for 24 hours. After addition of 12 ml of petroleum ether, the potassium chloride which has precipitated is filtered off over a membrane filter. The filtrate is concentrated and dried under reduced pressure. 9-Methylene-14-oxo-11-phenyl-1,8,10,13-tetraoxa[14](4,4')-biphenylophane remains as a viscous colorless oil.

EXAMPLE 2

A solution of the cyclic ketone acetal (50% by weight) 9-methylene-14-oxo-11-phenyl-1,8,10,13-tetraoxo[14](4,4')-biphenylophane from Example 1c and 1% by weight of O-isopropylbenzoin in tetrahydrofuran is coated onto a glass substrate by the spincoating technique and dried at 50° for 5 minutes.

A movable mask with a slit-shaped opening 1 mm wide is fixed above the layer at a distance of 2 mm. The mask is irradiated with UV light from a high pressure mercury vapor lamp and is at the same time moved over the layer at a relative speed of 0.5 mm/second. A colorless, firmly adhering polymer film is formed, the main polymer chains and monomer units of which are oriented to a high degree parallel to the substrate surface and which has marked non-linear optical properties.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an article comprising a substrate coated on its surface with a polymer layer containing polar monomer units, the improvement wherein the monomer units and main polymer chains of the polymer originating from cyclic monomers have a substantially parallel orientation with respect to the surface due to the cyclic structure of the monomers and wherein said monomer units have a dipolar arrangement.

2. An article of claim 1, wherein at least about 60% of said monomer units and 60% of the main polymer chains have an angular deviation from the horizontal of not more than about 10°.

3. An article according to claim 1, wherein said cyclic polar monomer units contain an electron donor polar group and an electron acceptor polar group.

4. A process for the preparation of an article according to claim 1, comprising polymerizing said monomer units by ring-opening polymerization in a desired direction of polymer growth by subjecting the monomer layer to zonal irradiation.

5. A method for achieving a non-linear optical effect by impinging light on a surface, the improvement comprising impinging light on a coated surface according to claim 1.

* * * * *